United States Patent
Ogata et al.

(10) Patent No.: US 10,837,641 B2
(45) Date of Patent: Nov. 17, 2020

(54) BURNER, COMBUSTOR, AND GAS TURBINE

(71) Applicant: KAWASAKI JUKOGYO KABUSHIKI KAISHA, Hyogo (JP)

(72) Inventors: Masahiro Ogata, Kobe (JP); Takeo Oda, Kobe (JP); Yasuhiro Kinoshita, Kobe (JP); Kohshi Hirano, Kakogawa (JP); Takahiro Uto, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 515 days.

(21) Appl. No.: 15/539,314

(22) PCT Filed: Dec. 25, 2015

(86) PCT No.: PCT/JP2015/086273
§ 371 (c)(1),
(2) Date: Jun. 23, 2017

(87) PCT Pub. No.: WO2016/104725
PCT Pub. Date: Jun. 30, 2016

(65) Prior Publication Data
US 2017/0356656 A1    Dec. 14, 2017

(30) Foreign Application Priority Data

Dec. 25, 2014   (JP) ................................ 2014-263454

(51) Int. Cl.
| | |
|---|---|
| *F23R 3/28* | (2006.01) |
| *F23R 3/36* | (2006.01) |
| *F23C 99/00* | (2006.01) |
| *F23D 17/00* | (2006.01) |
| *F23R 3/34* | (2006.01) |
| *F23R 3/30* | (2006.01) |

(Continued)

(52) U.S. Cl.
CPC ................ *F23R 3/286* (2013.01); *F02C 7/22* (2013.01); *F02C 9/40* (2013.01); *F23C 1/00* (2013.01);

(Continued)

(58) Field of Classification Search
CPC .... F23R 3/28; F23R 3/286; F23R 3/30; F23R 3/34; F23R 3/346; F23R 3/36; F02C 7/22; F02C 7/236; F02C 9/40
See application file for complete search history.

(56) References Cited

U.S. PATENT DOCUMENTS

| | | | |
|---|---|---|---|
| 8,001,786 B2 * | 8/2011 | Oda .......................... | F23R 3/50 60/742 |
| 8,465,276 B2 * | 6/2013 | Prade ...................... | F23L 7/002 431/12 |

(Continued)

FOREIGN PATENT DOCUMENTS

| | | |
|---|---|---|
| CN | 102168851 A | 8/2011 |
| JP | 2008-522123 A | 6/2008 |

(Continued)

OTHER PUBLICATIONS

International Search Report issued in PCT/JP2015/086273; dated Mar. 29, 2016.

*Primary Examiner* — Arun Goyal
(74) *Attorney, Agent, or Firm* — Studebaker & Brackett PC

(57) ABSTRACT

The present invention provides a burner, a combustor equipped with the burner, and a gas turbine, with which it is possible to premix a first hydrocarbon-based fuel (for example, natural gas), a second fuel (for example, hydrogen gas), and combustion air, and to spray into the combustion chamber of the combustor a thin and uniform concentration distribution of the premixed air, and with which it is possible to suppress the amount of NOx discharged. On the upstream side of the premix flow path, hydrogen gas is sprayed from second fuel spray nozzles, which project into the premix flow path, into the flow of the combustion air flowing toward the center from the outer edge of an outer cylinder, whereby a primary air-fuel mixture having a uniform concentration (Continued)

distribution is generated without affecting a low-speed region of the combustion air. Natural gas is then sprayed from first fuel spray nozzles into the primary air-fuel mixture, whereby the natural gas, which has a high specific gravity, and the primary air-fuel mixture are adequately mixed in a stirring fashion, and a secondary air-fuel mixture (premixed air) is generated that is lean and has a more uniform concentration distribution than the first air-fuel mixture. By combusting this type of premixed air in the combustion chamber, NOx in the combustion exhaust gas can be suppressed.

15 Claims, 11 Drawing Sheets

(51) Int. Cl.
 *F02C 9/40* (2006.01)
 *F02C 7/22* (2006.01)
 *F23C 1/00* (2006.01)
(52) U.S. Cl.
 CPC .............. *F23C 99/00* (2013.01); *F23D 17/00* (2013.01); *F23R 3/28* (2013.01); *F23R 3/30* (2013.01); *F23R 3/34* (2013.01); *F23R 3/346* (2013.01); *F23R 3/36* (2013.01); *F23R 2900/00002* (2013.01)

(56) References Cited

U.S. PATENT DOCUMENTS

| | | | |
|---|---|---|---|
| 8,511,097 B2* | 8/2013 | Kobayashi | F23R 3/343 |
| | | | 431/260 |
| 9,429,324 B2* | 8/2016 | Matsuyama | F23R 3/14 |
| 2008/0280239 A1 | 11/2008 | Carroni et al. | |
| 2008/0289340 A1* | 11/2008 | Oda | F23R 3/28 |
| | | | 60/737 |
| 2011/0094234 A1 | 4/2011 | Khan et al. | |
| 2011/0094239 A1 | 4/2011 | Koizumi et al. | |
| 2013/0283801 A1 | 10/2013 | Romig et al. | |
| 2015/0275755 A1 | 10/2015 | Ogata et al. | |
| 2016/0033131 A1 | 2/2016 | Ogata et al. | |

FOREIGN PATENT DOCUMENTS

| | | |
|---|---|---|
| JP | 2008-185247 A | 8/2008 |
| JP | 2011-075174 A | 4/2011 |
| JP | 2012-247135 A | 12/2012 |
| JP | 2013-227885 A | 11/2013 |
| JP | 2013-231580 A | 11/2013 |
| JP | 2013-234769 A | 11/2013 |
| WO | 2014/092185 A1 | 6/2014 |
| WO | 2015/037295 A1 | 3/2015 |

\* cited by examiner

US 10,837,641 B2

BURNER, COMBUSTOR, AND GAS TURBINE

TECHNICAL FIELD

The present invention relates to a burner, a combustor, and a gas turbine.

BACKGROUND

In recent years, from the viewpoints of prevention of global warming and effective use of resources, gas turbines are requested to use a byproduct hydrogen gas secondarily generated from a manufacturing process of a petrochemical plant etc. in addition to a natural gas that is a main fuel of the gas turbines.

Patent Document 1 discloses a gas turbine combustor having a combustion cylinder forming a combustion chamber thereinside, a casing covering the outside of the combustion cylinder and forming a flow path of a compressed air (hereinafter referred to as "combustion air") supplied from a compressor around the combustion cylinder, a first fuel nozzle corresponding to a main burner disposed upstream of the combustion cylinder and injecting a first fuel (coal gasification gas) into the combustion chamber, and a plurality of second fuel nozzles corresponding to reheating burners disposed downstream of the first fuel nozzle and penetrating a circumferential wall of the combustion cylinder from the casing, and the gas turbine combustor injects a second fuel (hydrogen-containing gas) radially inward from the circumferential wall of the combustion cylinder into the combustion chamber so as to diffuse and combust the second fuel in a combustion product gas.

On the other hand, a lean premixed combustion method (Dry Low Emission combustion method) is attracting attention as a method of suppressing a NOx emission amount without using water or steam and, in recent years, gas turbines having combustors (DLE combustors) employing this combustion method are operating at plant facilities etc.

Therefore, the present applicant has proposed a combustor of a gas turbine including a reheating burner injecting a lean premixed gas acquired by preliminarily mixing a combustion air, a hydrocarbon-based first fuel (e.g., a natural gas), and a second fuel (e.g., a hydrogen gas) in a downstream region in a combustion chamber of a DLE combustor in PCT/JP2014/065657 (unpublished).

This reheating burner is a burner mixing the combustion air introduced into a premixing flow path from the upstream side and the first and second fuels in the premixing flow path to generate the premixed gas and injecting the premixed gas from the downstream side into the combustion chamber for combustion, and has first and second fuel injection holes injecting the first and second fuels into a premixing chamber.

PRIOR ART DOCUMENT

Patent Document

Patent Document 1: Japanese Patent Application Publication No. 2011-75174

SUMMARY OF THE INVENTION

Considering the generation of the premixed gas composed of the combustion air, the first fuel, and the second fuel in the structure of the reheating burner proposed by the present applicant, the hydrogen gas has an extremely small specific gravity as compared to the natural gas (density of hydrogen gas: 0.09 kg/m3N, density of natural gas: 0.62 kg/m3N). Therefore, the hydrogen gas itself injected from the second fuel injection hole has a small penetrating force (i.e., a kinetic energy when the hydrogen gas is injected), so that stirring and mixing with other fluids become insufficient in the premixing flow path, which makes it difficult to generate a lean premixed gas having a uniform concentration distribution. Thus, a local high-temperature region generated during combustion results in an increase in NOx emission amount and, therefore, room for further improvement exists.

It is therefore an object of the present invention to provide a burner capable of premixing a hydrocarbon-based first fuel (e.g., natural gas), a second fuel (e.g., hydrogen gas), and a combustion air and injecting a lean premixed gas having a uniform concentration distribution into a combustor combustion chamber and capable of suppressing a NOx emission amount, a combustor equipped with the burner, and a gas turbine.

A burner of the present invention is a burner mixing a combustion air introduced into a premixing flow path from an upstream side and a fuel in the premixing flow path to generate a premixed gas and injecting the premixed gas from a downstream side into a combustion chamber for combustion, the burner comprising an outer cylinder having the premixing flow path formed inside; a first air introduction part supplying the combustion air from the outer edge toward the center of the outer cylinder on the upstream side of the premixing flow path; a first fuel introduction part introducing a first fuel into the premixing flow path; and a second fuel introduction part introducing a second fuel having a specific gravity smaller than the first fuel into the premixing flow path, wherein the second fuel introduction part is formed projecting from an upstream-side end portion of the premixing flow path toward the downstream side into the premixing flow path, wherein the second fuel introduction part has a plurality of second fuel injection nozzles injecting the second fuel to a compressed air introduced from the first air introduction part, wherein the second fuel is injected from the second fuel injection nozzles to the combustion air to generate a primary air-fuel mixture, and wherein the first fuel is introduced from the first fuel introduction part to the primary air-fuel mixture to generate a secondary air-fuel mixture.

According to this construction, the second fuel is injected from the second fuel injection nozzles to the combustion air flowing from the outer edge toward the center of the outer cylinder on the upstream side of the premixing flow path to generate the first air-fuel mixture. In this case, the second fuel is injected into the flow of the combustion air from the second fuel injection nozzles projecting from the upstream-side end portion of the premixing flow path into the premixing flow path, avoiding a low speed area (viscous boundary layer) of the compressed air generated in the vicinity of the upstream-side end portion of the premixing flow path. Therefore, for example, even in the case of the second fuel having a small specific gravity and a low penetrating force like a hydrogen gas, the lean primary air-fuel mixture having a uniform concentration distribution is generated without a risk of retention in the low flow area described above. Subsequently, the first fuel is introduced from the first fuel introduction part to the primary air-fuel mixture to generate the secondary air-fuel mixture (premixed gas). In this case, since the first fuel has a greater specific gravity than the second fuel, the first fuel and the primary air-fuel mixture are sufficiently stirred and mixed so that the lean secondary air-fuel mixture is generated with a more uniform concentration distribution than the primary air-fuel mixture. As a result, the lean premixed gas having a uniform concentration distribution is supplied to the combustion chamber, and the NOx amount can be suppressed in a combustion exhaust gas.

The first fuel introduction part included in the burner may have a first fuel injection nozzle projecting concentrically with the outer cylinder from the upstream-side end portion of the premixing flow path into the premixing flow path and injecting the first fuel toward the outer edge of the outer cylinder.

According to this construction, the primary air-fuel mixture flowing from the outer edge toward the center of the outer cylinder on the upstream side of the premixing flow path flows along the outer circumference of the first fuel injection nozzle toward the downstream side of the premixing flow path and, subsequently, the first fuel is injected from the first fuel injection nozzle to the primary air-fuel mixture to generate the secondary air-fuel mixture. In this case, since the first fuel is injected in a direction intersecting with the flow direction of the primary air-fuel mixture, the mixing of the first fuel and the primary air-fuel mixture is promoted, so that the secondary air-fuel mixture is generated with a uniform concentration distribution. As a result, the lean premixed gas having a uniform concentration distribution is supplied to the combustion chamber, and NOx can be suppressed in the combustion exhaust gas.

The burner may comprise a straightening protrusion part projecting concentrically with the outer cylinder from the upstream-side end portion of the premixing flow path into the premixing flow path; the first fuel introduction part included in the burner may be formed in the upstream-side end portion of the premixing flow path on the outer edge side relative to the straightening protrusion part; and the first fuel introduction part may have a plurality of first fuel injection holes inclined toward the outer edge of the outer cylinder.

According to this construction, the secondary air-fuel mixture is generated by injecting the primary air-fuel mixture from the first fuel injection holes inclined toward the outer edge of the outer cylinder to the primary air-fuel mixture flowing from the outer edge toward the center of the outer cylinder on the upstream side of the premixing flow path. In this case, since the first fuel is injected in a direction intersecting with the flow of the primary air-fuel mixture, the mixing of the primary fuel-air mixture and the first fuel is promoted in the premixing flow path, so that the secondary air-fuel mixture is generated with a uniform concentration distribution. As a result, the lean premixed gas having a uniform concentration distribution is supplied to the combustion chamber, and the generation of NOx can be suppressed. Additionally, since the secondary air-fuel mixture changes the direction and flows along the straightening protrusion part toward the downstream side and is injected into the combustion chamber without lowering the speed, a backfire can be suppressed.

The burner may comprise a straightening protrusion part projecting concentrically with the outer cylinder from the upstream-side end portion of the premixing flow path into the premixing flow path, and the first fuel introduction part may include a plurality of first fuel injection nozzles injecting the first fuel from the outer edge toward the center of the outer cylinder on the downstream side relative to the first air introduction part.

According to this construction, the primary air-fuel mixture flowing from the outer edge toward the center of the outer cylinder on the upstream side of the premixing flow path changes the direction and flows along the straightening protrusion part toward the downstream side. Subsequently, the first fuel is injected from the first fuel injection holes toward the center of the outer cylinder to the primary air-fuel mixture to generate the secondary air-fuel mixture. In this case, since the first fuel is injected in a direction intersecting with the flow of the primary air-fuel mixture, the mixing of the primary fuel-air mixture and the first fuel is promoted in the premixing flow path, so that the secondary air-fuel mixture is generated with a uniform concentration distribution. As a result, the lean premixed gas having a uniform concentration distribution is supplied to the combustion chamber, and the generation of NOx can be suppressed. Additionally, since the primary air-fuel mixture flows along the straightening protrusion part toward the downstream side without lowering the speed, a reduction in flow speed is suppressed when the direction is changed. Therefore, the premixed gas is injected into the combustion chamber while maintaining a sufficient flow speed, so that the backfire can be suppressed.

The burner may comprise a second air introduction part introducing the combustion air from the outer edge of the outer cylinder into the premixing flow path, on the downstream side relative to the first air introduction part. The outer cylinder may be made up of a first cylindrical body on the upstream side and a second cylindrical body on the downstream side arranged coaxially with each other; the first cylindrical body and the second cylindrical body may be arranged to partially overlap in the direction of the axis; and the second air introduction part may be defined by the first cylindrical body and the second cylindrical body and may be an annular gap gradually decreasing in diameter from the upstream side to the downstream side. In this case, the inner diameter of the second cylindrical body may be substantially the same as the inner diameter of the first cylindrical body on the downstream side thereof. A portion of the combustion air is blown onto the outer circumference of the first cylindrical body and is then introduced as a secondary air into the second air introduction part. By introducing the secondary air from the second air introduction part, the retention of the premixed gas can be suppressed in a boundary layer. The secondary air is uniformly straightened while flowing through the second air introduction part from the upstream side to the downstream side. Since the secondary air is fed into the premixing flow path, the retention of the air-fuel mixture can more effectively be suppressed in the boundary layer. On the other hand, the secondary air flows through the annular gap gradually decreasing in diameter from the upstream side to the downstream side and thereby can form a flow guiding the premixed gas retained in the boundary layer toward the center of the flow path. If the inner diameter of the second cylindrical body is made substantially the same as the inner diameter of the first cylindrical body on the downstream side thereof, the flow rate of the premixed gas flowing through the premixing flow path can be balanced.

According to this construction, the occurrence of the low speed area is restrained in the vicinity of the inner surface of the outer cylinder and the backfire can be suppressed.

The first fuel may be a natural gas or a liquefied natural gas, and the second fuel may be a hydrogen gas or a hydrogen-containing gas.

A combustor of the present invention is a gas turbine combustor of a comprising a combustion cylinder forming a combustion chamber combusting a fuel; a premixing type main burner disposed upstream of the combustion cylinder; and a reheating burner disposed through a downstream-side circumferential wall portion of the combustion cylinder, wherein the reheating burner is the burner according to any of the above descriptions.

This construction enables provision of a combustor having a reheating burner capable of injecting a premixed gas having a uniform concentration distribution into the combustion chamber of the combustor and capable of suppressing a NOx emission amount.

Furthermore, a gas turbine of the present invention comprises the combustor described above.

This construction enables provision of a gas turbine equipped with a combustor capable of suppressing a NOx emission amount.

The present invention can provide the burner capable of suppressing a NOx emission amount by premixing the first fuel (e.g., natural gas), the second fuel (e.g., hydrogen gas), and the combustion air and injecting the premixed gas having a uniform concentration distribution into the combustor combustion chamber, the combustor equipped with the burner, and the gas turbine.

DETAILED DESCRIPTION OF EMBODIMENTS

A burner, a combustor, and a gas turbine according to embodiments of the present invention will now be described with reference to the accompanying drawings. The following description is merely an exemplification of a form of the present invention and is not intended to limit the technical scope of the present invention, the application of the present invention, or the use thereof.

First Embodiment

Figure 1:
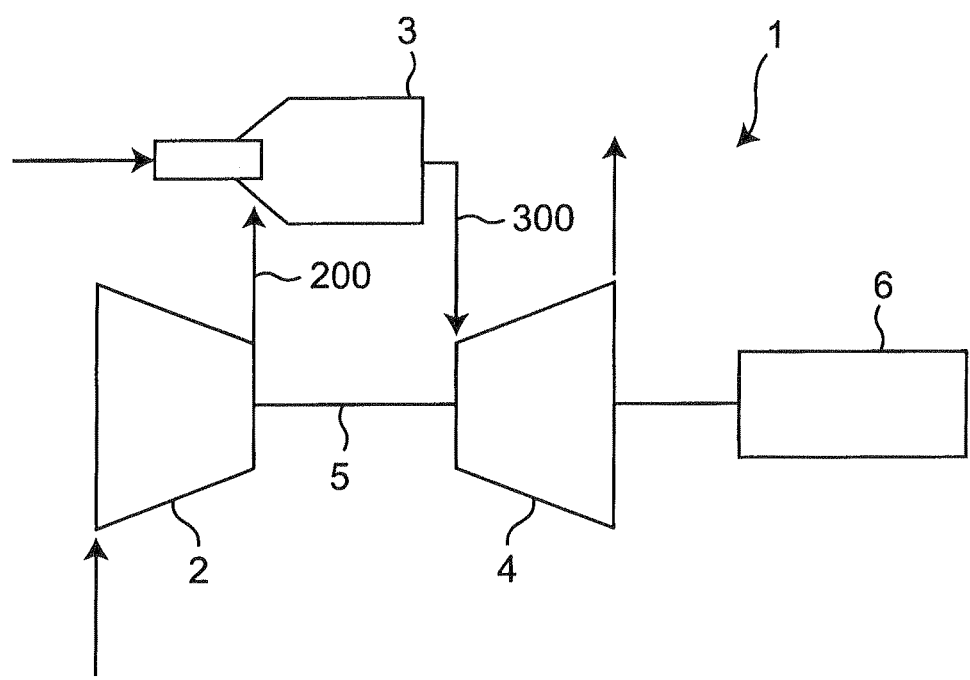
FIG. 1 is a diagram of a general construction of a gas turbine according to an embodiment of the present invention.

A general construction and function of a gas turbine is shown in FIG. 1. In the gas turbine 1, a compressor 2 sucks an atmospheric air to generate a compressed air 200. The compressed air 200 is combusted together with a fuel in a combustor 3 to generate a high-temperature high-pressure combustion product gas (hereinafter referred to as "combustion exhaust gas 300"). The combustion exhaust gas 300 is supplied to a turbine 4 and used for rotating a rotor 5. The rotation of the rotor 5 is transmitted to the compressor 2 and used for generating the compressed air 200 (hereinafter referred to as "combustion air 200"), while the rotation of the rotor 5 is transmitted to a generator 6 and used for electric generation, for example.

Figure 2:
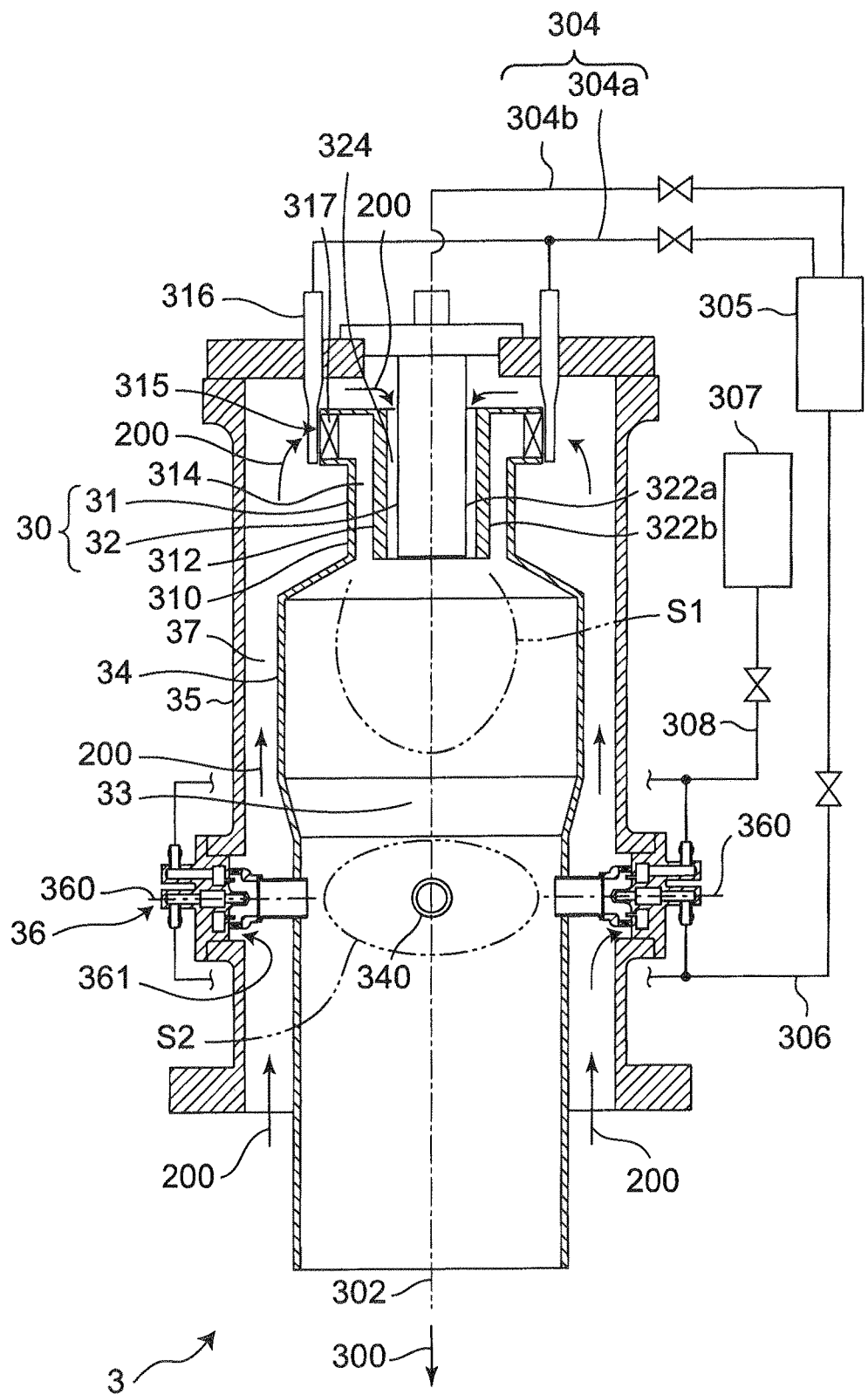
FIG. 2 is a longitudinal cross section of a combustor according to one embodiment of the present invention.

FIG. 2 shows the combustor 3. In this embodiment, the combustor 3 is a reverse-flow can-type combustor in which a flow direction of the compressed air 200 supplied from the compressor (see FIG. 1) (a direction from the top to the bottom of FIG. 1) and a flow direction of the combustion exhaust gas 300 (a direction from the bottom to the top of FIG. 1) are opposed to each other. The combustor may be an annular type having a plurality of fuel injection valves on a circumference thereof.

The combustor 3 includes a combustion cylinder 34 and a casing 35 concentrically arranged on a central axis 302. A burner unit 30 is attached to the top of the combustion cylinder 34, and a combustion chamber 33 for combusting a fuel etc. injected from the burner unit 30 is formed inside the combustion cylinder 34. The combustion cylinder 34 is surrounded by a cylindrical casing 35 so that an annular combustion air flow path 37 is formed between the combustion cylinder 34 and the casing 35, in which the combustion air 200 supplied from the compressor flows. The casing 35 and the combustion cylinder 34 support a plurality of reheating burners 36 on the downstream side relative to the burner unit 30.

In this embodiment, the burner unit 30 is disposed along the central axis 302 and includes a premixing type main burner 31 for injecting a premixed gas generated by mixing the fuel and the combustion air 200 into the combustion chamber 33 and a diffusion combustion type pilot burner 32 for injecting the fuel directly into the combustion chamber 33. The main burner 31 is concentrically disposed around the pilot burner 32. The main burner 31 and the pilot burner 32 are in communication with a first fuel supply source 305 (natural gas supply source) through a piping 304.

In this embodiment, the main burner 31 has an outer cylinder 310 and an inner cylinder 312 arranged concentrically along the central axis 302. In this embodiment, as shown in the figure, the inner cylinder 312 also serves as a combustion air injection cylinder 322b of the pilot burner 32 described later. An annular space between the outer cylinder 310 and the inner cylinder 312 is used as a premixing flow path 314 for mixing the fuel and the combustion air. The premixing flow path 314 has one end opened to the combustion chamber 33 and the other end opened radially outward through a plurality of air intake ports 315 to the combustion air flow path 37. A plurality of main fuel nozzles 316 for injecting a first fuel is arranged radially outside the air intake ports 315. Although not shown, preferably, the plurality of the air intake ports 315 and the plurality of the main fuel nozzles 316 corresponding thereto are arranged at regular intervals in the circumferential direction around the central axis 302. Although not shown, the main fuel nozzles 316 each have a plurality of fuel injection holes (not shown) formed at a position facing the air intake port 315 to inject the first fuel toward the air intake port 315 and are connected to the first fuel supply source 305 (natural gas supply source) through a piping 304a including a flow regulating valve so that, when the flow regulating valve is opened at the time of normal operation, the fuel supplied from the first fuel supply source 305 is supplied from the air intake ports 315 to the premixing flow path 314 along with the combustion air supplied from the combustion air flow path 37 and is mixed in the premixing flow path 314, and the premixed gas is injected into the combustion chamber 33. In this embodiment, a plurality of swirl vanes (swirlers) 317 is provided in the air intake ports 315 to impart a swirling force to the combustion air flowing into the premixing flow path 314 so as to promote premixing with the first fuel.

The pilot burner 32 includes a fuel injection cylinder 322a extending along the central axis 302 and a combustion air injection cylinder 322b concentrically covering the fuel injection cylinder 322a, and a fuel injection path (not shown) formed in the fuel injection cylinder 322a is connected to the first fuel supply source 305 (natural gas supply source) through a piping 304b including a flow regulating valve so that, when the flow regulating valve is opened at the time of startup, the natural gas supplied from the first fuel supply source is injected into the combustion chamber. An annular air flow path 324 is formed between the fuel injection cylinder 322a and the combustion air injection cylinder 322b and has one end connected to the combustion air flow path 37 and the other end connected to the combustion chamber so that the compressed air supplied from the compressor is injected into the combustion chamber.

The reheating burners 36 are each attached to the casing 35 and the combustion cylinder 34 along four axes 360 included on a plane orthogonal to the central axis 302 and circumferentially arranged at equal intervals. As described in detail later, the reheating burners 36 are connected to a first fuel supply source 305 (natural gas supply source) and a second fuel supply source 307 (hydrogen gas supply source) through a piping including a flow regulating valve and are configured such that, when the flow regulating valve is opened at the time of high-load operation, the first fuel and the second fuel can be mixed with the combustion air taken in from the combustion air flow path 37 to generate a premixed gas so as to inject the premixed gas into the combustion chamber. The first fuel refers to a gas containing 60 vol % or more hydrocarbons and 10 vol % or less hydrogen gas, or a liquid containing 60 vol % or more hydrocarbons. The second fuel refers to a gas containing 50 vol % or more hydrogen. In this embodiment, a natural gas is illustrated as an example of the first fuel and a hydrogen gas is illustrated as an example of the second fuel.

The operation of the combustor 3 so constructed will hereinafter be described with reference to FIG. 2. As shown in FIG. 2, when the gas turbine (not shown) is started, the flow regulating valve is opened, and the natural gas supplied from a main fuel supply source to the pilot burner 32 is injected into the combustion chamber 33. The gas is diffusively mixed in the combustion chamber 33 with the combustion air injected from the annular air flow path 324 into the combustion chamber 33 and is ignited by an ignition source not shown to form a pilot flame from diffusion combustion.

When the gas turbine shifts to a normal operation, the premixed gas injected from the premixing flow path 314 of the main burner 31 is ignited by the pilot flame in the combustion chamber 33 and is combusted in a primary combustion region S1 on the upstream side of the combustion chamber 33. By combusting a lean premixed gas, the combustion flame temperature in the combustion chamber 33 decreases and an amount of NOx in the combustion exhaust gas of the main burner is suppressed.

When high-load combustion is requested so as to raise the output of the gas turbine, a premixed gas of the natural gas, the hydrogen gas, and the combustion air 200 generated in the reheating burners 36 is introduced into the combustion chamber 33 and is mixed with the combustion exhaust gas of the main burner 31 and combusted in a secondary combustion region S2 on the downstream side relative to the primary combustion region S1. By combusting a lean premixed gas, an amount of NOx in the combustion exhaust gas is suppressed.

A reheating burner according to an embodiment of the present invention will be described with reference to the accompanying drawings.

Figure 3:
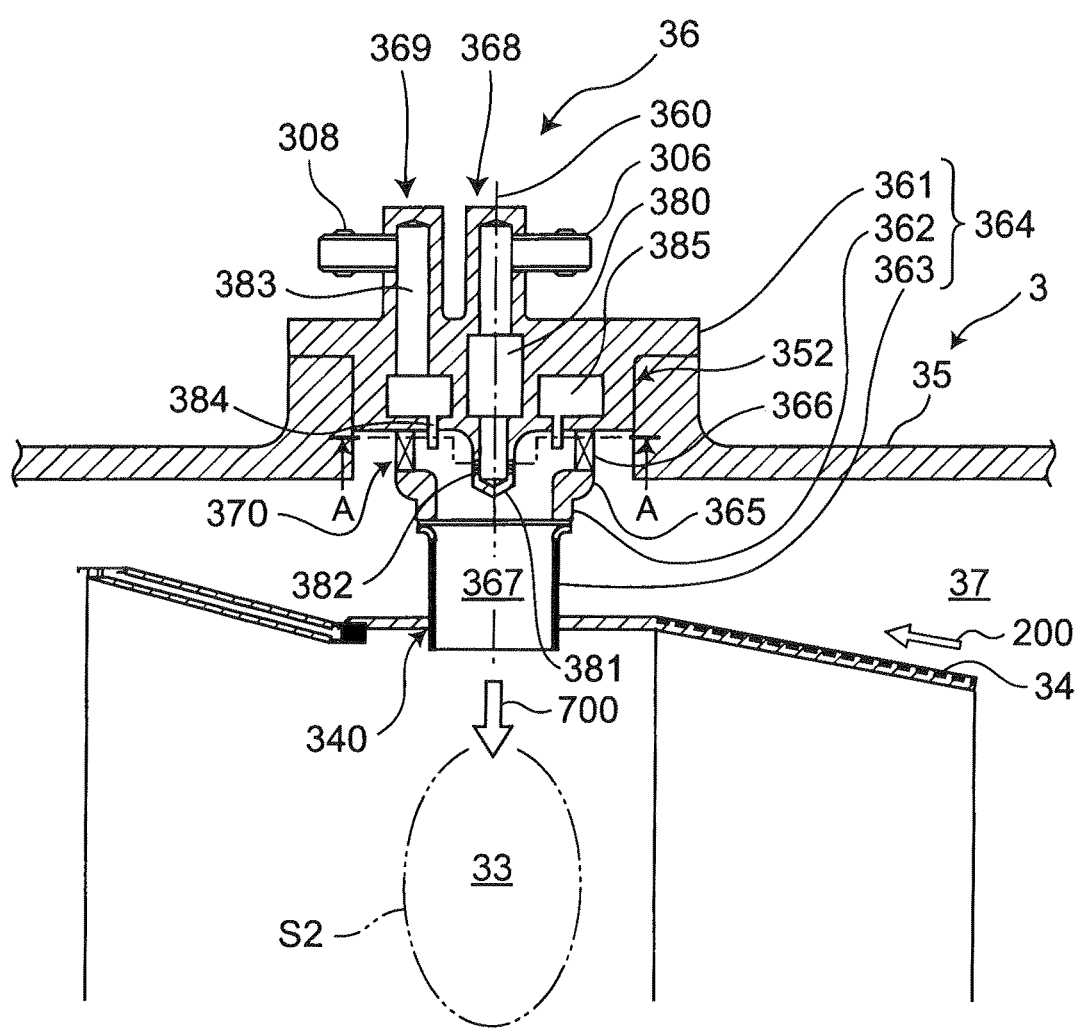
FIG. 3 is a longitudinal cross section of a reheating burner according to a first embodiment of the present invention.
Figure 4:
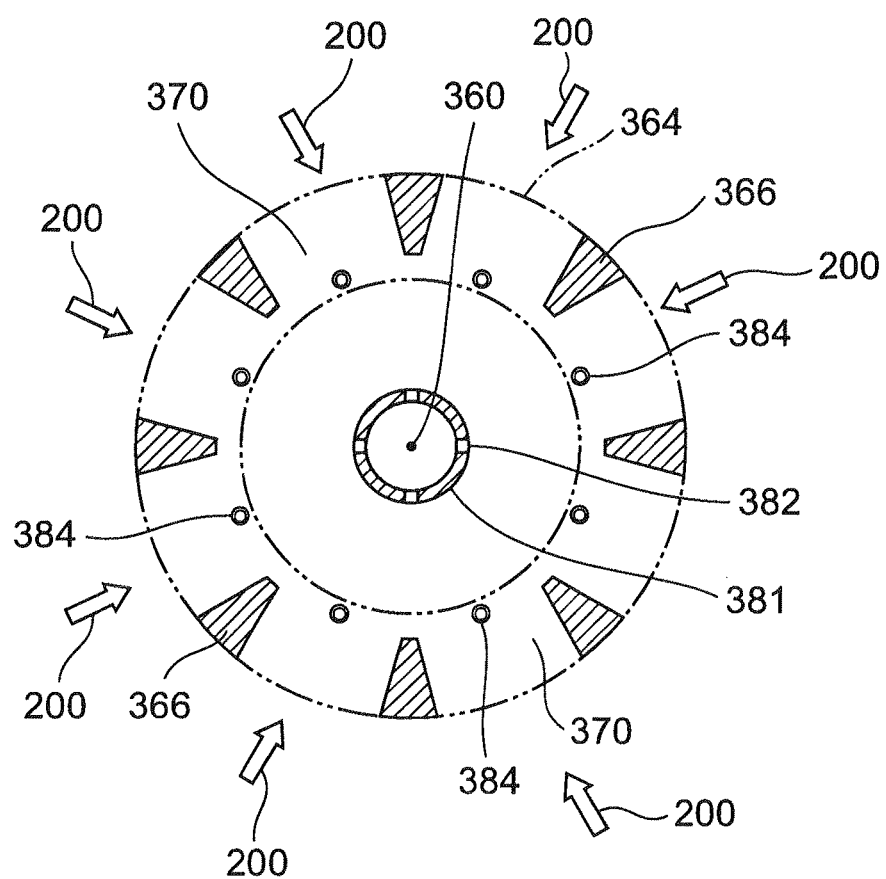
FIG. 4 is a transverse section of a premixing flow path when viewed in a direction A-A of FIG. 3.

The reheating burner 36 according to a first embodiment of the present invention is shown in FIG. 3. FIG. 3 shows a cross section corresponding to that in FIG. 2, and FIG. 4 shows a cross section taken along A-A indicated by arrows of FIG. 3. In the following description related to the structure and the operation of the reheating burner 36, the terms "upstream side" and "downstream side" are used with respect to a flow direction of a fluid in the reheating burner 36.

As shown in FIG. 3, the reheating burner 36 includes an outer cylinder 364 having a plurality of construction elements, for example, a head block 361, a first cylindrical part 362, and a second cylindrical part 363 arranged in order from the outside toward the inside on the axis 360 in a radial direction with respect to the central axis 302 of the combustor 3. The head block 361 is fitted and fixed to an attaching hole 352 formed in the casing 35, and a flange part 365 of the first cylindrical part 362 is fixed to the head block 361 via a plurality of coupling pieces 366, while the second cylindrical part 363 is fitted and fixed to a through-hole 340 formed in the combustion cylinder 34. A premixing flow path 367 for mixing the fuel and the combustion air 200 is formed as an internal space surrounded by the head block 361, the first cylinder 362, and the second cylindrical part 363.

The reheating burner 36 also includes a first fuel introduction part 368 for introducing the natural gas supplied from the first fuel supply source into the premixing flow path 367, a second fuel introduction part 369 for introducing the hydrogen gas supplied from the second fuel supply source into the premixing flow path 367, and a first air introduction part 370 for introducing the combustion air 200 from the combustion air flow path 37 into the premixing flow path 367.

The first air introduction part 370 is formed as a plurality of gap spaces (air intake ports) surrounded by the flange part 365 of the first cylindrical part 362, the head block 361, and the plurality of coupling pieces 366 coupling the flange part and the head block, so that a portion of the compressed air 200 (the combustion air 200) flowing through the combustion air flow path 37 can be introduced from the first air introduction part 370 into the premixing flow path 367. The combustion air 200 introduced into the premixing flow path 367 flows from the outer edge (radially outer side) toward the center (radially inner side) of the outer cylinder 364. The coupling pieces 366 are arranged at equal intervals of 45 degrees on a circumference concentric with the outer cylinder 364 and are arranged at circumferential positions separated from second fuel injection nozzles 384 described later, and air intake holes are arranged at circumferential positions corresponding to the second fuel injection nozzles 384.

The first fuel introduction part 368 includes a first fuel supply path 380 extending in the head block 361 along the axis 360 from the upstream side to the downstream side and a first fuel injection nozzle 381 having a bottomed cylindrical shape projecting from a downstream-side wall surface of the head block 361 along the axis 360 into the premixing flow path 367.

The upstream side of the first fuel supply path 380 is in communication with the first fuel supply source through a piping 306 including a flow regulating valve, and the downstream side of the first fuel supply path 380 is in communication with the premixing flow path 367 through a plurality of first fuel injection holes 382 formed by radially penetrating a circumferential wall of the first fuel injection nozzle 381. The first fuel injection holes 382 are arranged at equal intervals in the circumferential direction and the axial direction. The holes are arranged at intervals of 90 degrees in the circumferential direction. With such a construction, the natural gas supplied from the first fuel supply source is injected via the first fuel supply path 380 and the first fuel injection nozzle 381 into the premixing flow path 367.

The second fuel introduction part 369 has a second fuel supply path 383 extending in the head block 361 from the upstream side to the downstream side and a plurality of cylindrical second fuel injection nozzles 384 projecting from the downstream-side wall surface of the head block 361 into the premixing flow path 367. The upstream side of the second fuel supply path 383 is connected to the second fuel supply source through a piping 308 including a flow regulating valve. The downstream side of the second fuel supply path 383 has an annular flow path 385 formed surrounding the first fuel supply path 380 and spreading concentrically with the outer cylinder 364. The downstream side of the annular flow path 385 is in communications with the premixing flow path 367 through the internal spaces of the second fuel injection nozzles 384. The second fuel injection nozzles 384 are arranged at equal intervals of 45 degrees on a circumference concentric with the outer cylinder 364 and extend in parallel with the outer cylinder. With such a construction, the hydrogen gas supplied from the second fuel supply source is injected via the second fuel supply path 383 and the second fuel injection nozzles 384 into the premixing flow path 367.

The operation of the reheating burner 36 having the construction described above will hereinafter be described with reference to FIGS. 2, 3, and 4. The combustion air 200 introduced from the first air introduction part 370 into the premixing flow path 367 flows from the outer edge toward the center of the outer cylinder 364 on the upstream side of the premixing flow path 367, and the hydrogen gas is then injected from the second fuel injection nozzles 384 to the combustion air 200 to generate a primary air-fuel mixture. In this case, the hydrogen gas is injected into the flow of the combustion air 200 from the second fuel injection nozzles 384 projecting from the upstream-side end portion of the premixing flow path 367 (the downstream-side wall surface of the head block 361) into the premixing flow path 367, avoiding a low speed area (viscous boundary layer) generated in the vicinity of the upstream-side end portion of the premixing flow path 367 (in the vicinity of the downstream-side wall surface of the head block 361). Therefore, even in the case of the hydrogen gas having a small specific gravity and a low penetrating force, the lean primary air-fuel mixture having a uniform concentration distribution is generated without a risk of retention in the low flow area described above. Subsequently, the primary air-fuel mixture changes the direction and flows along the outer circumference of the first fuel injection nozzle 381 toward the downstream side of the premixing flow path 367 before being mixed with the natural gas injected from the first fuel injection nozzle 381 to generate a secondary air-fuel mixture.

In this case, since the natural gas has a greater specific gravity than the hydrogen gas, the natural gas and the primary air-fuel mixture are sufficiently stirred and mixed so that the lean secondary air-fuel mixture is generated with a more uniform concentration distribution than the primary air-fuel mixture. Additionally, since the first fuel (natural gas) is injected from the first fuel injection nozzle 381 in a direction intersecting with the flow direction of the primary air-fuel mixture, the mixing of the first fuel and the primary air-fuel mixture is promoted so that the concentration distribution of the secondary air-fuel mixture becomes uniform. As a result, a lean premixed gas 700 (secondary air-fuel mixture) having a uniform concentration distribution is supplied to the secondary combustion region S2 downstream of the primary combustion region S1 of the combustion chamber 33, and the NOx amount can be suppressed in the combustion exhaust gas.

Figure 5:
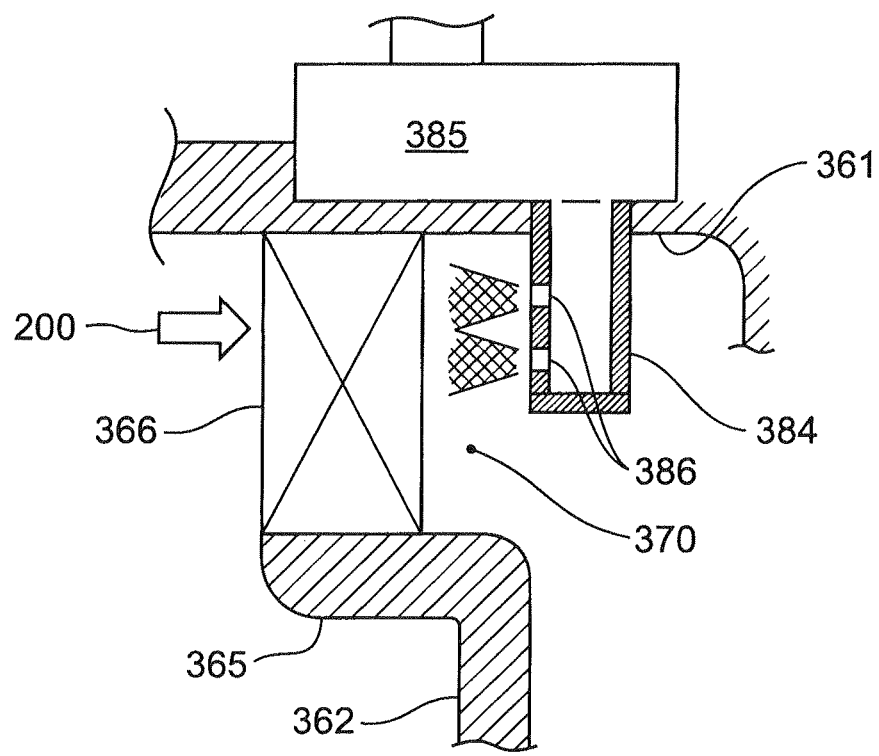
FIG. 5 is a diagram of a modified example of the first embodiment.

The reheating burner according to the first embodiment described above can variously be modified. For example, as shown in FIG. 5, the reheating burner may be configured to inject the hydrogen gas from second fuel injection holes 386 formed in the circumferential walls of the second fuel injection nozzles 384 to a flow of the combustion air 200 in a direction opposite to the flow. According to the construction, since the hydrogen gas injected from the second fuel injection holes 386 collides with the combustion air 200, the dispersion effect of the hydrogen gas is improved. As a result, the mixing of the hydrogen gas and the combustion air 200 is promoted, so that the more uniform primary air-fuel mixture can be generated. In the case of this modification example, the number of the second fuel injection holes 386 may be one; however, by making a plurality of the second fuel injection holes 386 as shown in FIG. 5, the dispersion effect of the hydrogen gas is further improved and the facilitation of mixing of the hydrogen gas and the combustion air can be expected.

Second Embodiment

Figure 6:
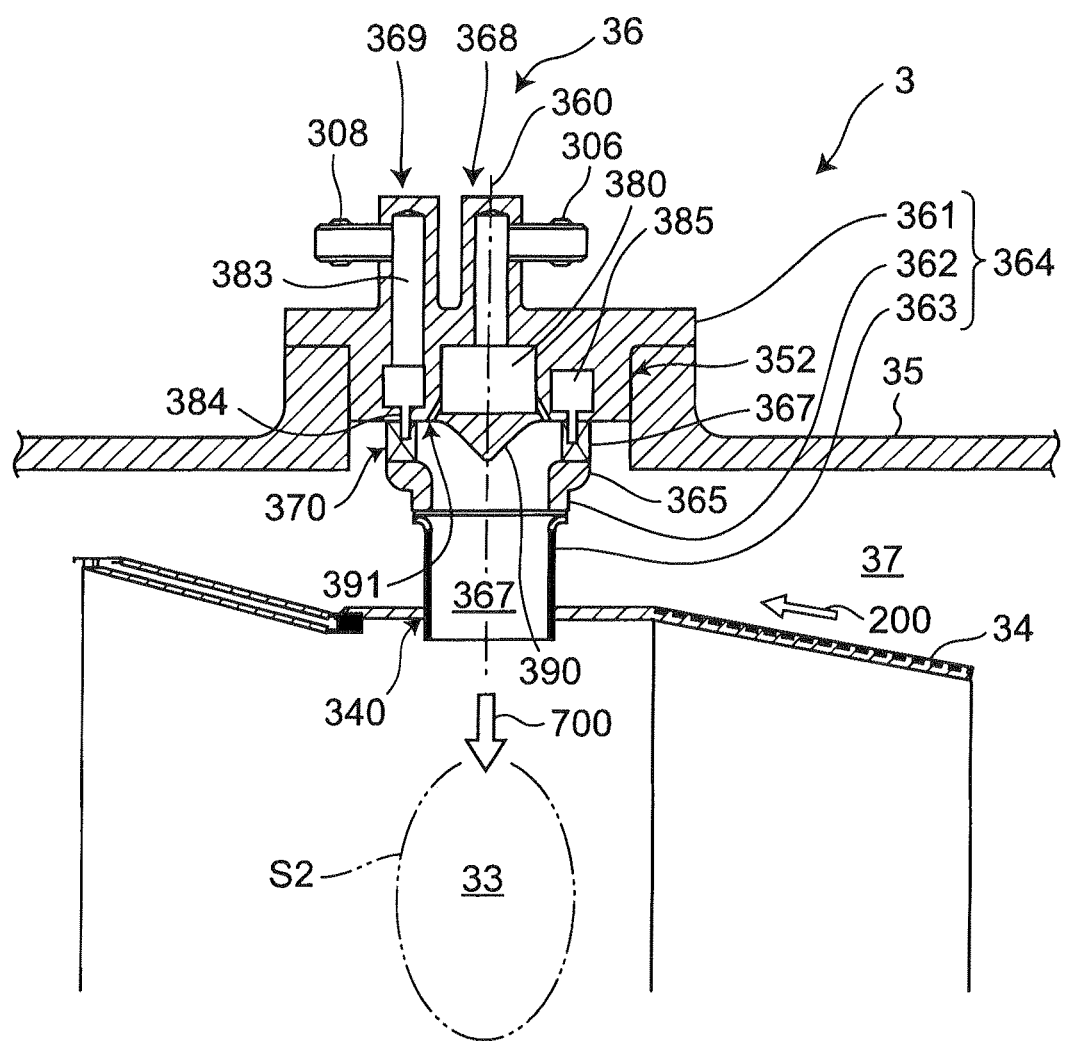
FIG. 6 is a longitudinal cross section of a reheating burner according to a second embodiment of the present invention.

A reheating burner according to a second embodiment of the present invention will be described. FIG. 6 shows the reheating burner 36 according to the second embodiment of the present invention. The basic structure of the reheating burner 36 according to this embodiment is the same as the reheating burner 36 according to the first embodiment described with reference to FIG. 3 and, therefore, the same constituent portions are denoted by the same reference numerals and will not be described.

The reheating burner 36 according to this embodiment has two points different from the reheating burner 36 according to the first embodiment described with reference to FIG. 3 in that an inverted conical straightening protrusion part 390 extending in the premixing flow path 367 coaxially with the outer cylinder 364 is formed on the downstream-side wall surface of the head block 361 and that the first fuel introduction part 368 is configured to inject the natural gas from a plurality of first fuel injection holes 391 surrounding the straightening protrusion part 390. The upstream side of the first fuel injection holes 391 is in communication with the first fuel supply path 380 and the downstream side of the first fuel injection holes 391 is in communication with the premixing flow path 367. The first fuel injection holes 391 are arranged on the circumference concentric with the outer cylinder 364 at equal intervals at circumferential positions corresponding to the second fuel injection nozzles 384 and the first air introduction part 370. The first fuel injection holes 391 are located closer than the second fuel injection nozzles 384 to the center of the outer cylinder 364 and are inclined toward the outer edge (radially outward) of the outer cylinder 364 from the upstream side to the downstream side.

The operation of the reheating burner 36 having the construction described above will be described. To the primary air-fuel mixture flowing from the outer edge toward the center of the outer cylinder 364 on the upstream side of the premixing flow path 367, the first fuel (natural gas) is injected from a plurality of the first fuel injection holes 391 formed in the downstream-side wall surface of the head block 361 (the upstream-side end portion of the premixing flow path 367) to generate the secondary air-fuel mixture. In this case, since the first fuel is injected in a direction intersecting with the flow of the primary air-fuel mixture, the mixing of the primary air-fuel mixture and the first fuel in the premixing flow path 367 is promoted, so that the secondary air-fuel mixture (premixed gas) having a uniform concentration is generated. As a result, the lean premixed gas 700 (secondary air-fuel mixture) having a uniform concentration distribution is supplied to the secondary combustion region S2 downstream of the primary combustion region S1 of the combustion chamber 33, and NOx can be suppressed in the combustion exhaust gas. Additionally, since the secondary air-fuel mixture flows to the downstream side without lowering the flow speed along the straightening protrusion part 390 and is injected into the combustion chamber 33, a backfire can be restrained from occurring due to a reduction in flow speed of the secondary air-fuel mixture.

Although an inverted conical straightening protrusion part 390 is employed in this embodiment, the shape of the straightening protrusion part 390 is not limited to an inverted conical shape. The part may have any outer circumferential shape capable of guiding the primary air-fuel mixture from the base end side to the distal end side. In particular, the part may have any shape as long as the cross-sectional area decreases from the base end side toward the distal end side, and may have a partial spherical shape, for example.

Third Embodiment

A reheating burner according to a third embodiment of the present invention will be described. FIGS. 7 to 10 show variations of the reheating burner 36 according to the third embodiment of the present invention. The structure of the reheating burner 36 of this embodiment is the same as the reheating burner 36 according to the first embodiment described with reference to FIG. 3 except that the burner has a second air introduction part 393 for introducing the combustion air 200 into the premixing flow path 367 on the downstream side relative to the first fuel introduction part 368 and, therefore, the same constituent portions are denoted by the same reference numerals and will not be described.

Figure 7:
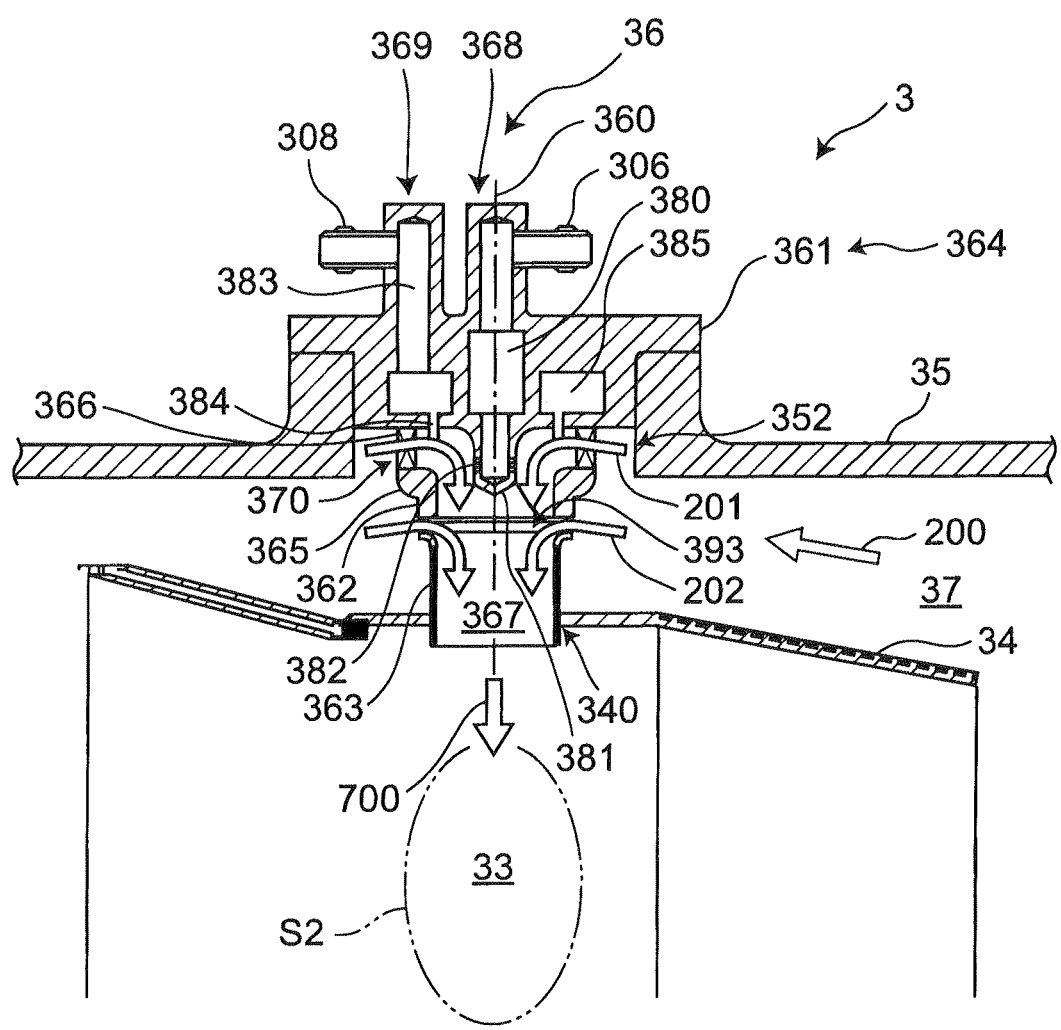
FIG. 7 is a longitudinal cross section of a first example of a reheating burner according to a third embodiment of the present invention.

FIG. 7 shows a first example of the reheating burner according to the third embodiment of the present invention. The second air introduction part 393 of the first example is a gap formed between the first cylindrical part 362 (the first cylindrical body) and the second cylindrical part 363 (the second cylindrical body). As shown in FIG. 7, the combustion air 200 flowing through the combustion air flow path 37 is distributed into a primary air 201 flowing in from the first air introduction part 370 and a secondary air 202 flowing in from the second air introduction part 393 before being introduced into the premixing flow path 367.

The secondary air 202 flowing into the premixing flow path 367 from the second air introduction part 393 suppresses occurrence of a low speed area in the vicinity of the inner wall surface of the second cylindrical part 363. As a result, a backfire can be prevented from being caused by movement of a combustion flame formed in the combustion chamber 33 to the vicinity of the inner wall surface of the second cylindrical part 363.

Figure 8:
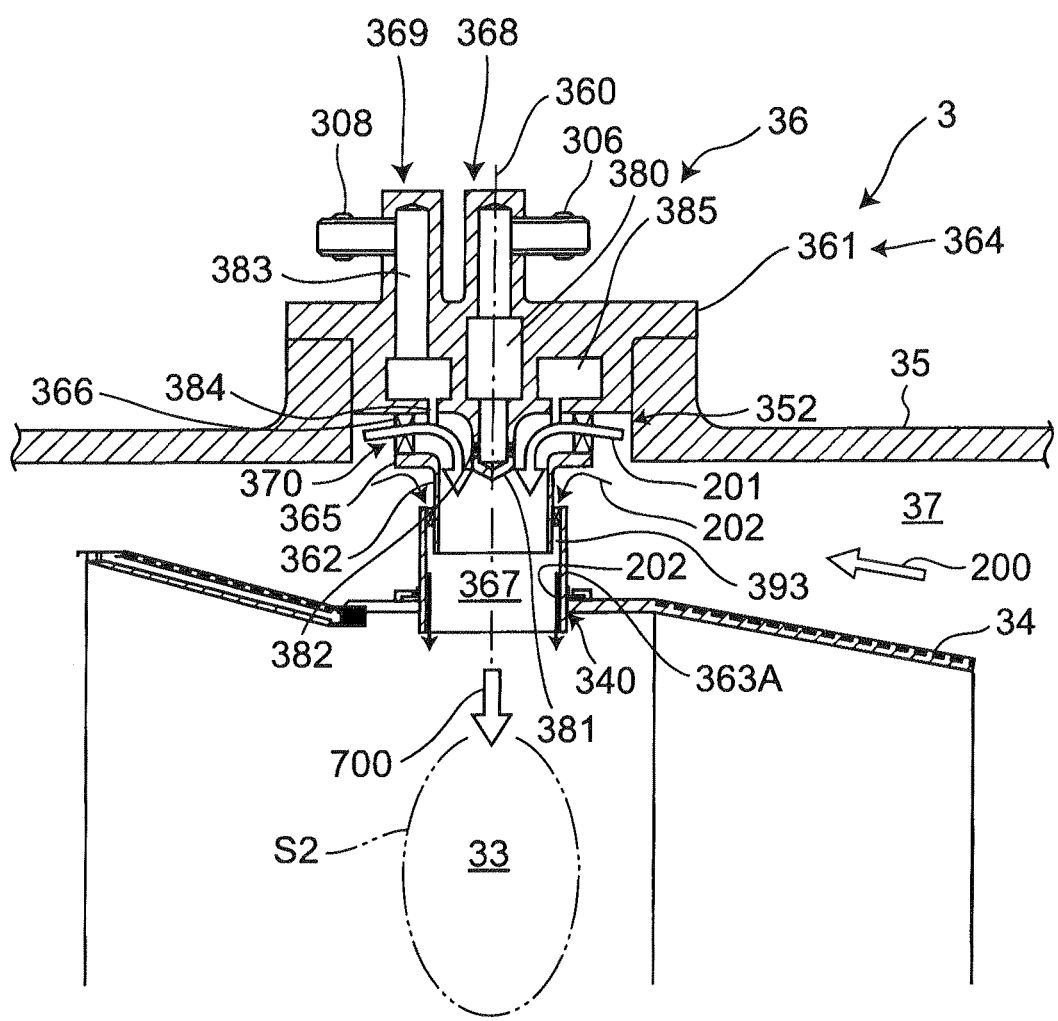
FIG. 8 is a longitudinal cross section of a second example of the reheating burner according to the third embodiment of the present invention.

FIG. 8 shows a second example of the reheating burner according to the third embodiment of the present invention. The reheating burner 36 of the second example includes a second cylindrical part 363A having a diameter larger than the first cylindrical part 362 and has a construction in which an upstream-side end portion of the second cylindrical part 363A and a downstream-side end portion of the first cylindrical part 362 are overlapped in the axial direction of the outer cylinder. The second air introduction part 393 of the second example is an annular gap formed between the outer circumferential surface of the first cylindrical part 362 and the inner circumferential surface of the second cylindrical part 363A. The secondary air 202 introduced into the premixing flow path 367 from the second air introduction part 393 is straightened while flowing through the annular gap from the upstream side to the downstream side, so as to flow intensively in the vicinity of the inner wall surface of the second cylindrical part 363A having a high concentration of the secondary air-fuel mixture 700, and is therefore more effective than the first example.

Figure 9:
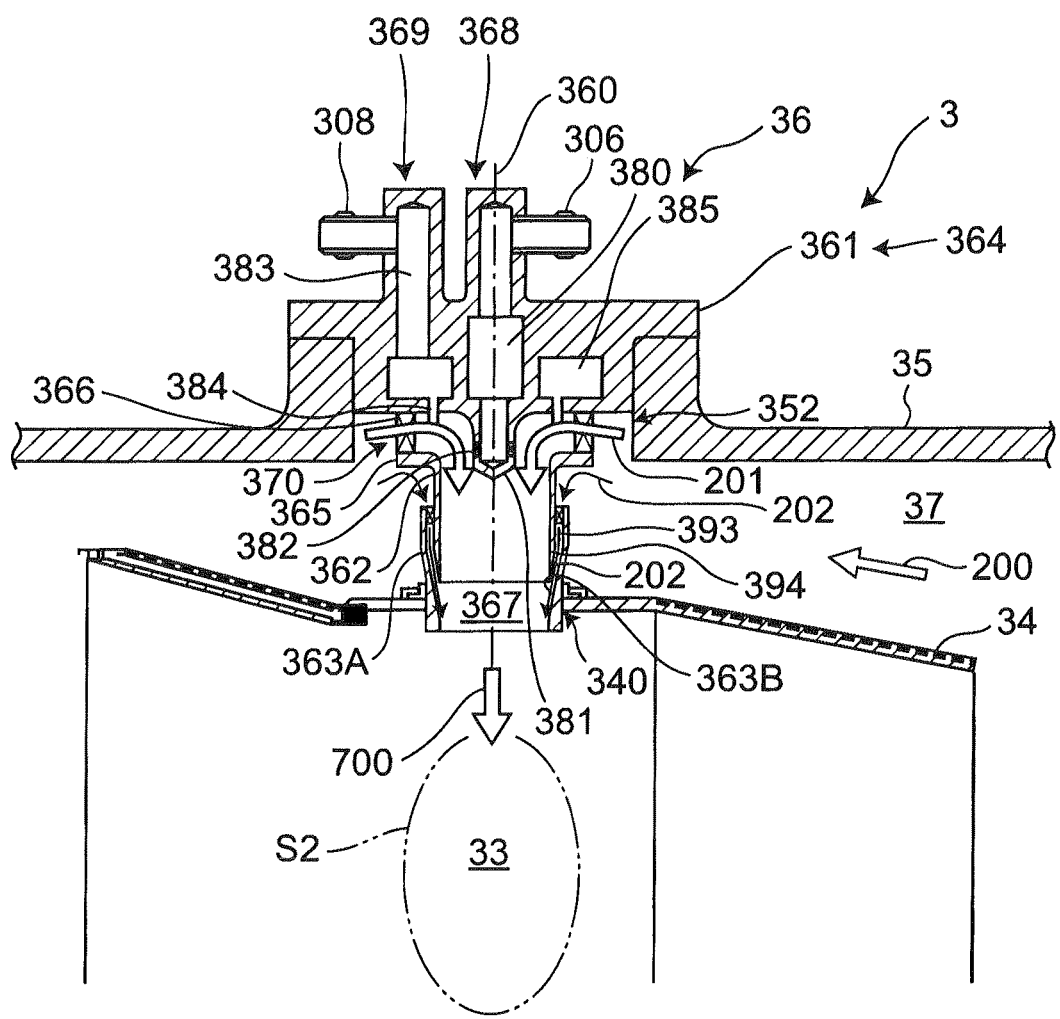
FIG. 9 is a vertical cross section of a third example of the reheating burner according to the third embodiment of the present invention.

FIG. 9 shows a third example of the reheating burner according to the third embodiment of the present invention. The reheating burner 36 of the third example has a construction for increasing the flow speed of the premixed gas 700 injected through the premixing flow path 367 into the combustion chamber 33. In the second air introduction part 393 in this construction, the annular gap defined by the first cylindrical part 362 and the second cylindrical part 363 gradually decreases in diameter toward the downstream side of the reheating burner 36. Specifically, in the reheating burner 36 of the third example, an inner circumferential surface 363B of the second air introduction part 393 in the second cylindrical part 363A gradually decreases in diameter from the upstream side to the downstream side. A tapered part 394 gradually decreasing in diameter from the upstream side to the downstream side is formed on the outer circumferential surface of the downstream-side end portion of the first cylindrical part 362 at a position facing the inner circumferential surface 363B. In the third example, the inner diameter of the second cylindrical part 363 may be substantially the same as the inner diameter of the first cylindrical part 362 on the downstream side thereof. The reheating burner 36 of the third example is the same as the reheating burner 36 of the second example shown in FIG. 8 except the construction described above and, therefore, the same constituent portions are denoted by the same reference numerals and will not be described. The reheating burner 36 of the third example having the construction described above produces the following effects. In particular, a portion of the compressed air 200 is blown onto the outer circumference of the first cylindrical part 362 and is then introduced as the secondary air 202 into the second air introduction part 393. By introducing the secondary air 202 from the second air introduction part 393, the retention of the premixed gas 700 can be suppressed in a boundary layer. The secondary air 202 is uniformly straightened while flowing through the second air introduction part 393 from the upstream side to the downstream side. Since the secondary air 202 is fed into the premixing flow path 367, the retention of the air-fuel mixture can more effectively be suppressed in the boundary layer. On the other hand, the secondary air 202 flows through the annular gap (the tapered part 394) gradually decreasing in diameter from the upstream side to the downstream side and thereby can forma flow guiding the premixed gas 700 retained in the boundary layer toward the center of the flow path (the radial inner side of the second cylindrical part 363A). If the inner diameter of the second cylindrical part 363 is made substantially the same as the inner diameter of the first cylindrical part 362 on the downstream side thereof, the flow rate of the premixed gas 700 flowing through the premixing flow path 367 can be balanced. As a result, the occurrence of the low speed area is further suppressed in the vicinity of the inner wall surface of the second cylindrical part 363A, so that the backfire can effectively be prevented from being caused by movement of a combustion flame formed in the combustion chamber 33 to the vicinity of the inner wall surface of the second cylindrical part 363A.

Figure 10:
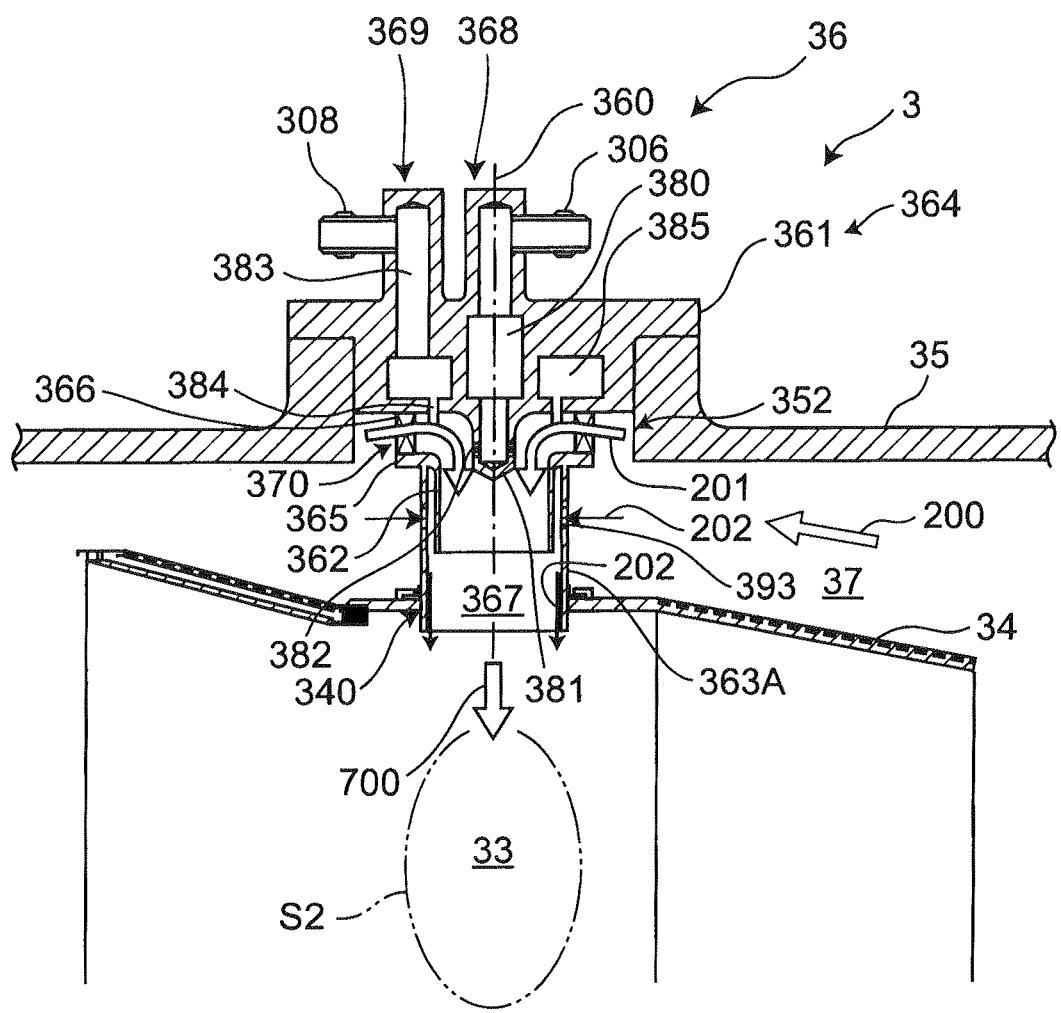
FIG. 10 is a longitudinal cross section of a fourth example of the reheating burner according to the third embodiment of the present invention.

FIG. 10 shows a fourth example of the reheating burner according to the third embodiment of the present invention. The reheating burner 36 of the fourth example includes the second cylindrical part 363A having a diameter larger than the first cylindrical part 362 and has a construction in which the upstream-side end portion of the second cylindrical part 363A is fixed to the flange part 365 of the first cylindrical part 362. The second air introduction part 393 of the third example is a plurality of inflow ports formed in a circumferential wall portion of the second cylindrical part 363A. This reheating burner 36 of the fourth example can produce the same effects as the second example.

In the reheating burner 36 according to the third embodiment of the present invention described above, the ratio between the primary air 201 flowing in from the first air introduction part 370 and the secondary air 202 flowing in from the second air introduction part 393 may normally be 1:1; however, it is confirmed in the experiments by the inventors that the ratio of the primary air 201 may be increased if consideration is given to the reduction of NOx and that the ratio of the secondary air 202 may be increased if consideration is given to the backfire prevention.

Fourth Embodiment

Figure 11:
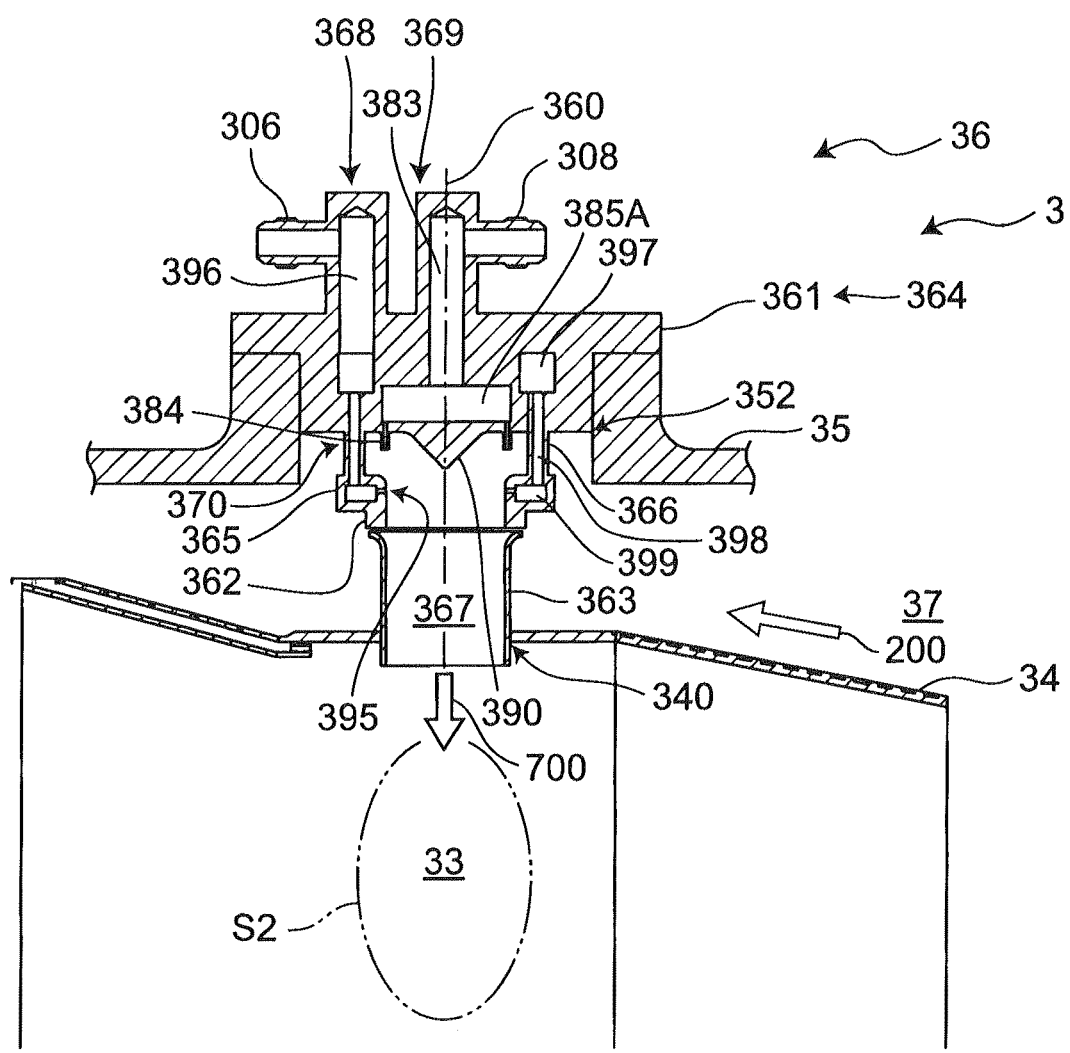
FIG. 11 is a longitudinal cross section of a reheating burner according to a fourth embodiment of the present invention.

A reheating burner according to a fourth embodiment of the present invention will be described. FIG. 11 shows the reheating burner 36 according to the fourth embodiment of the present invention. In the reheating burner 36 of this embodiment, the same constituent portions as those of the reheating burner 36 according to the first and second embodiments described with reference to FIGS. 3 and 6, respectively, are denoted by the same reference numeral and will not be described.

As shown in FIG. 11, the reheating burner 36 according to this embodiment has three points different from the reheating burner 36 according to the first embodiment described with reference to FIG. 3 in that the first fuel introduction part 368 is configured to inject the natural gas from a plurality of first fuel injection holes 395 circumferentially arranged at equal intervals in the first cylindrical part 362, that the same straightening protrusion part 390 as the second embodiment is formed on the downstream-side wall surface of the head block 361, and that the second fuel supply path 383 is formed along the axis 360.

As shown in FIG. 11, the first fuel introduction part 368 is made up of a columnar passage part 396 formed on the upstream side of the head block 361, a first annular passage part 397 formed on the downstream side of the head block 361, a branch passage part 398 formed on the downstream side relative to the first annular passage 397 and extending from the downstream side of the head block 361 through the coupling pieces 366 to the first cylindrical part 362, and a second annular passage part 399 formed in the flange part 365 of the first cylindrical part 362 and allowing branch passages 398 to join together. The first annular passage part 397 is disposed concentrically with the outer cylinder 364 to surround the second fuel supply passage 383. The branch passage part 398 has two branch passages and is configured to penetrate two circumferentially opposed coupling pieces 366. The second annular passage part 399 is disposed concentrically with the outer cylinder 364. As shown in the figure, the plurality of the first fuel injection holes 395 is circumferentially formed at equal intervals in the inner surface of the first cylindrical part 362. The first fuel injection holes 395 extend radially outward to communicate with the second annular passage part 399.

As shown in the figure, the second fuel supply path 383 extends from the upstream side to the downstream side along the axis 360 and has the upstream side connected to the second fuel supply source through the piping 308 having a flow regulating valve and the downstream side to which the second fuel injection nozzles 384 are connected through a header portion 385A.

It is noted that the reheating burner 36 of this embodiment can employ a construction in which the secondary air 202 is introduced into the premixing flow path 367 as described in the first to fourth examples of the reheating burner 36 of the third embodiment.

The operation of the reheating burner 36 so constructed will hereinafter be described with reference to FIG. 11.

Since the primary air-fuel mixture flowing from the outer edge toward the center of the outer cylinder 364 on the upstream side of the premixing flow path 367 flows along the straightening protrusion part 390 to the downstream side without lowering the flow speed and is injected into the combustion chamber 33 as the premixed gas 700 (secondary air-fuel mixture) mixed with the first fuel, the backfire can be restrained from occurring due to a reduction in flow speed of the premixed gas. In this case, since the first fuel (natural gas) has a greater specific gravity than the second fuel (hydrogen gas), the first fuel and the primary air-fuel mixture are sufficiently stirred and mixed by the first fuel, so that the lean premixed gas 700 is generated with a more uniform concentration distribution than the primary air-fuel mixture. Additionally, since the first fuel is injected in a direction intersecting with the flow direction of the primary air-fuel mixture, the mixing of the first fuel and the primary air-fuel mixture is promoted so that the concentration distribution becomes uniform. As a result, the lean premixed gas 700 having a uniform concentration distribution is injected to the secondary combustion region S2 downstream of the primary combustion region S1 of the combustion chamber 33, and NOx can be suppressed in the combustion exhaust gas.

EXPLANATIONS OF LETTERS OR NUMERALS 1 gas turbine
2 compressor
3 combustor
4 turbine
5 rotor
6 generator
31 main burner
32 pilot burner
33 combustion chamber
34 combustion cylinder
36 reheating burner (fuel injection device)
37 combustion air flow path (air flow path)

200 compressed air (combustion air)
300 combustion exhaust gas
360 axis
361 head block
362 first cylindrical part
363 second cylindrical part
364 outer cylinder
366 coupling piece
367 premixing flow path
368 first fuel introduction part
369 second fuel introduction part
370 first air introduction part
380 first fuel supply path
381 first fuel injection nozzle
382 first fuel injection hole
383 second fuel supply path
384 second fuel injection nozzle
390 straightening protrusion part
393 second air introduction part
700 premixed gas

The invention claimed is:

1. A burner mixing a combustion air introduced into a premixing flow path from an upstream side of the burner and a first fuel and a second fuel in the premixing flow path to generate a premixed gas and injecting the premixed gas from a downstream side of the burner radially inwards into a combustion chamber for combustion, the burner comprising:
   an outer cylinder having the premixing flow path formed inside and extending from an upstream-side end to the downstream side;
   a first air introduction part which supplies the combustion air from an outer edge of the outer cylinder towards the center of the outer cylinder on the upstream-side end of the premixing flow path;
   a first fuel introduction part which introduces the first fuel into the premixing flow path along a center line of the outer cylinder; and
   a second fuel introduction part which introduces the second fuel having a specific gravity smaller than the first fuel into the premixing flow path, the second fuel being different from the first fuel,
   wherein the second fuel introduction part is formed projecting from the upstream-side end of the premixing flow path toward the downstream side into the premixing flow path,
   wherein the second fuel introduction part has a plurality of second fuel injection nozzles injecting the second fuel to the combustion air introduced from the first air introduction part,
   wherein the second fuel is injected from the second fuel injection nozzles to the combustion air to generate a primary air-fuel mixture, and
   wherein the first fuel is introduced from the first fuel introduction part to the primary air-fuel mixture to generate the premixed gas,
   wherein the premixed gas is ejected into the combustion chamber for combustion.

2. The burner according to claim 1, wherein the first fuel introduction part has a first fuel injection nozzle projecting concentrically with the outer cylinder from the upstream-side end portion of the premixing flow path into the premixing flow path and injecting the first fuel toward the outer edge of the outer cylinder.

3. The burner according to claim 1, comprising a straightening protrusion part projecting concentrically with the outer cylinder from the upstream-side end of the premixing flow path into the premixing flow path,
   wherein the first fuel introduction part is formed in the upstream-side end of the premixing flow path towards the outer edge relative to the straightening protrusion part, and
   wherein the first fuel introduction part has a plurality of first fuel injection holes injecting the first fuel in a direction inclined toward the outer edge of the premixing flow path.

4. The burner according to claim 1, comprising a straightening protrusion part projecting concentrically with the outer cylinder from the upstream-side end of the premixing flow path into the premixing flow path,
   wherein the first fuel introduction part includes a plurality of first fuel injection nozzles injecting the first fuel from the outer edge toward the center of the outer cylinder towards the downstream side relative to the first air introduction part.

5. The burner according to claim 1, comprising a second air introduction part introducing an additional portion of the combustion air from the outer edge of the outer cylinder into the premixing flow path, towards the downstream side relative to the first air introduction part.

6. The burner according to claim 5,
   wherein the outer cylinder is made up of a first cylindrical body on the upstream side and a second cylindrical body on the downstream side arranged coaxially with each other,
   wherein the first cylindrical body and the second cylindrical body are arranged to partially overlap along the center line, and
   wherein the second air introduction part is defined by the first cylindrical body and the second cylindrical body and is an annular gap gradually decreasing in diameter from the upstream side to the downstream side.

7. The burner according to claim 1, wherein the first fuel is a natural gas or a liquefied natural gas, and wherein the second fuel is a hydrogen gas or a hydrogen-containing gas.

8. A combustor of a gas turbine comprising:
   a combustion cylinder forming a combustion chamber combusting a fuel;
   a premixing type main burner disposed upstream of the combustion cylinder; and
   a reheating burner disposed through a downstream-side circumferential wall portion of the combustion cylinder,
   wherein the reheating burner is a burner for mixing a combustion air introduced into a premixing flow path from an upstream side of the burner and a first fuel and a second fuel in the premixing flow path to generate a premixed gas and injecting the premixed gas from a downstream side of the burner radially inwards into a combustion chamber for combustion, the burner comprising
   an outer cylinder having the premixing flow path formed inside and extending from an upstream-side end to the downstream side;
   a first air introduction part which supplies the combustion air from an outer edge of the outer cylinder towards the center of the outer cylinder on the upstream-side end of the premixing flow path;
   a first fuel introduction part which introduces the first fuel into the premixing flow path along a center line of the outer cylinder; and
   a second fuel introduction part which introduces the second fuel having a specific gravity smaller than the first fuel into the premixing flow path, the second fuel being different from the first fuel, wherein the second fuel introduction part is formed projecting from the upstream-side end portion of the premixing flow path toward the downstream side into the premixing flow path, wherein the second fuel introduction part has a plurality of second fuel injection nozzles injecting the second fuel to the combustion air introduced from the first air introduction part, wherein the second fuel is injected from the second fuel injection nozzles to the combustion air to generate a primary air-fuel mixture, and wherein the first fuel is introduced from the first fuel introduction part to the primary air-fuel mixture to generate the premixed gas, wherein the premixed gas is ejected into the combustion chamber for combustion.

9. The combustor according to claim 8, wherein the first fuel introduction part has a first fuel injection nozzle projecting concentrically with the outer cylinder from the upstream-side end portion of the premixing flow path into the premixing flow path and injecting the first fuel toward the outer edge of the outer cylinder.

10. The combustor according to claim 8, comprising a straightening protrusion part projecting concentrically with the outer cylinder from the upstream-side end of the premixing flow path into the premixing flow path, wherein the first fuel introduction part is formed in the upstream-side end of the premixing flow path towards the outer edge relative to the straightening protrusion part, and wherein the first fuel introduction part has a plurality of first fuel injection holes injecting the first fuel in a direction inclined toward the outer edge of the premixing flow path.

11. The combustor according to claim 8, comprising a straightening protrusion part projecting concentrically with the outer cylinder from the upstream-side end of the premixing flow path into the premixing flow path, wherein the first fuel introduction part includes a plurality of first fuel injection nozzles injecting the first fuel from the outer edge toward the center of the outer cylinder towards the downstream side relative to the first air introduction part.

12. The combustor according to claim 8, comprising a second air introduction part introducing an additional portion of the combustion air from the outer edge of the outer cylinder into the premixing flow path, towards the downstream side relative to the first air introduction part.

13. The combustor according to claim 12, wherein the outer cylinder is made up of a first cylindrical body on the upstream side and a second cylindrical body on the downstream side arranged coaxially with each other, wherein the first cylindrical body and the second cylindrical body are arranged to partially overlap along the center line, and wherein the second air introduction part is defined by the first cylindrical body and the second cylindrical body and is an annular gap gradually decreasing in diameter from the upstream side to the downstream side.

14. The combustor according to claim 8, wherein the first fuel is a natural gas or a liquefied natural gas, and wherein the second fuel is a hydrogen gas or a hydrogen-containing gas.

15. A gas turbine comprising the combustor according to claim 8.

* * * * *